United States Patent
Chinthekindi et al.

(10) Patent No.: US 11,455,114 B1
(45) Date of Patent: Sep. 27, 2022

(54) CONSOLIDATION AND MIGRATION OF CLOUD DATA

(71) Applicant: EMC IP Holding Company LLC, Hopkinton, MA (US)

(72) Inventors: Ramprasad N. Chinthekindi, Cupertino, CA (US); George Mathew, Belmont, CA (US); Rahul Goyal, Madhya Pradesh (IN); Mahesh Kamat, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 6 days.

(21) Appl. No.: 17/214,196

(22) Filed: Mar. 26, 2021

(51) Int. Cl.
*G06F 3/06* (2006.01)

(52) U.S. Cl.
CPC ............ *G06F 3/0649* (2013.01); *G06F 3/067* (2013.01); *G06F 3/0614* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 9,740,759 B1 * | 8/2017 | Zhang | G06F 16/27 |
| 10,951,704 B1 * | 3/2021 | Frank | G06F 9/45558 |
| 11,093,442 B1 * | 8/2021 | Bhutani | G06F 16/2365 |
| 2019/0005053 A1 * | 1/2019 | Khurange | G06F 3/0614 |

FOREIGN PATENT DOCUMENTS

WO WO-2021126586 A1 * 6/2021

\* cited by examiner

*Primary Examiner* — Brian R Peugh
(74) *Attorney, Agent, or Firm* — Womble Bond Dickinson (US) LLP

(57) ABSTRACT

A method of migrating or consolidating cloud data includes generating a container on a cloud platform and receiving, at the container, source metadata identifying a set of data to be migrated from a source cloud bucket associated with a source data domain to a destination cloud bucket associated with a destination data domain. The method further includes copying, by the container, set of data from the source cloud bucket to the destination cloud bucket based on the source metadata and generating, by the container, destination metadata for the set of data as stored at the destination cloud bucket.

20 Claims, 6 Drawing Sheets

CONSOLIDATION AND MIGRATION OF CLOUD DATA

FIELD OF THE INVENTION

Embodiments of the present invention relate generally to data storage systems. More particularly, embodiments of the invention relate to consolidation and migration of cloud data.

BACKGROUND

Data domain (DD) storage solutions provide for migrating of files from on-premises active tier to object storage located in the cloud for long term retention and cost savings. The data can be de-duplicated and stored in containers consisting of compression regions of the segments. As files are migrated from on-premises active tiers to the cloud tier, the data containers are written as objects in a cloud bucket or cloud object store.

BRIEF DESCRIPTION OF THE DRAWINGS

Embodiments of the invention are illustrated by way of example, and not limitation, in the figures of the accompanying drawings in which like references indicate similar elements.

DETAILED DESCRIPTION

Figure 1:
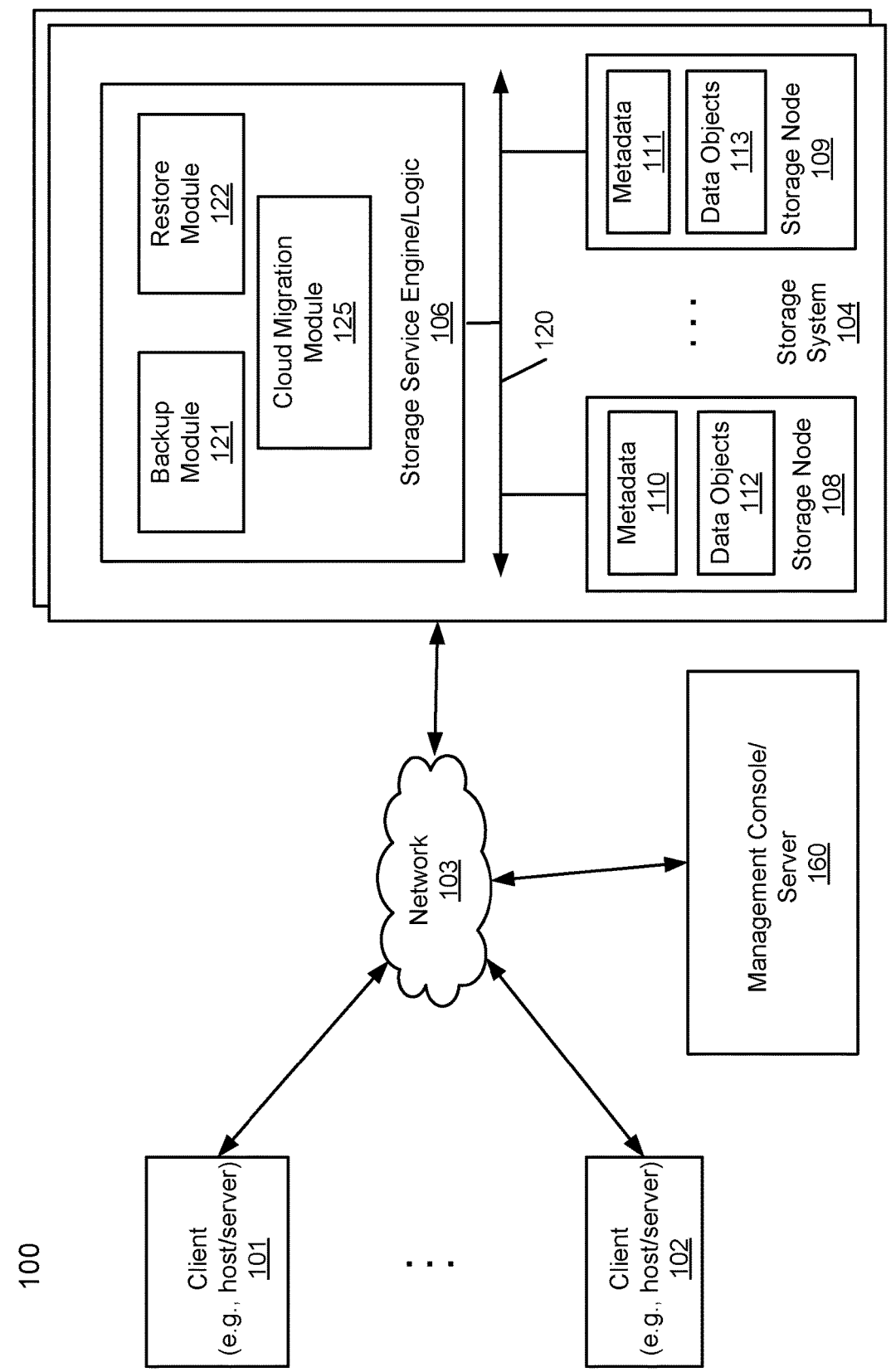
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A data domain of a distributed file system can include a cloud tier solution in which data of the data domain is stored at a cloud bucket (e.g., object storage) of a cloud provider. For example, users of a data domain may migrate files from on-premises nodes of a distributed file system to object storage in the cloud for long term retention of the data and for cost savings. The data stored in the cloud may be de-duplicated and stored in containers consisting of compression region segments. As files are migrated from on-premises active-tier to the cloud-tier, the data containers are written as objects in the cloud bucket, or cloud object store. The metadata of the objects (e.g., fingerprint, object-id, etc.) is stored locally on the on-premises data domain nodes for efficient deduplication and garbage collection of dead data.

In some circumstances, a customer may begin use of data domain systems with several small capacity data domain systems each having its own cloud tier with a separate cloud bucket. When customers move to a larger capacity data domain system the customer may prefer to consolidate the cloud buckets from the smaller capacity data domain systems into one cloud bucket attached to the larger data domain system. In another example, customers may migrate data from one cloud storage tier to another. For example, cloud providers may offer several tiers of cloud storage, ranging from faster block storage, slower object storage, slowest cloud storage, etc., each varying in access latency and cost. As such, customers may migrate infrequently accessed data to slower, less expensive tiers. Customers may also migrate data from a current cloud provider to a new cloud provider.

To perform any of the migrations or consolidations between cloud buckets, conventional data domain systems recall the data from the cloud buckets to the corresponding on-premises data domain systems. The data is then moved to the destination data domain system and then finally moved to the cloud bucket attached to the destination data domain. Thus, the data must make three moves to reach the destination cloud bucket. The egress costs of the data from the cloud provider to the on-premises data domain may be substantial. For example, the egress consumes large amounts of network bandwidth and incurs network latencies. Therefore, migration or consolidation of data across cloud buckets or provider in conventional systems are very slow and prohibitively expensive. Furthermore, conventional systems require staging storage space at the on-premises source and destination data domain storage systems before moving the data to the destination cloud bucket.

Embodiments of the present disclosure address the above, and other, issues of the conventional systems. In particular, the present disclosure provides for methods of efficient migration and consolidation of cloud data between cloud buckets. When migrating data from a first cloud bucket to a second cloud bucket, processing logic identifies the data segments that are to be migrated and generates a virtual compute instance (i.e., a container). The container may receive, from the on-premises data domain system, metadata identifying the data of the source bucket to be migrated to the destination cloud bucket. The container may then copy the cloud data identified by the metadata from the source destination to the destination cloud bucket. The container can then generate metadata for the data copied to the source destination and provide the metadata to the on-premises data domain system for the destination cloud bucket.

Accordingly, the present disclosure improves the migration of data between cloud buckets by avoiding egress costs due to data movement between cloud buckets within the same region, saves network bandwidth, and reduces latency of data movement. Additionally, embodiments of the present disclosure reduce storage staging requirements at the on-premises source and destination systems and prevents multiple transfers of data during the data migration.

In one embodiment, a method of migrating or consolidating cloud data includes generating a container on a cloud platform and receiving, at the container, source metadata identifying a set of data to be migrated from a source cloud bucket associated with a source data domain to a destination cloud bucket associated with a destination data domain. The method further includes copying, by the container, the set of data from the source cloud bucket to the destination cloud bucket based on the source metadata and generating, by the container, destination metadata for the set of data as stored at the destination cloud bucket.

In one embodiment, the method further includes storing the destination metadata for the set of data as stored at the destination cloud bucket at a local tier of on-premises storage of the destination data domain. In one embodiment, the source cloud bucket and the destination cloud bucket are located on a single cloud platform. In an alternative embodiment, the source cloud bucket is located on a first cloud storage platform and the destination cloud bucket is located on a second cloud storage platform. In one embodiment, the set of data comprises a plurality of data regions of one or more data object containers at the source cloud bucket.

In one embodiment, the source metadata identifying the set of data to be migrated comprises a plurality of tuples identifying each of the plurality data regions of the one or more data object containers at the source cloud bucket. In one embodiment, copying the set of data from the source cloud bucket to the destination cloud bucket includes retrieving, by the container, the plurality of data regions from the one or more data object containers of the source cloud bucket, generating, by the container a destination container for the plurality of data regions, and copying, by the container, the plurality of data regions to the destination container.

In one embodiment, a system includes a memory and a processing device operatively coupled to the memory to perform operations including generating a container on a cloud platform and receiving, at the container, source metadata identifying a set of data to be migrated from a source cloud bucket associated with a source data domain to a destination cloud bucket associated with a destination data domain. The operations further include copying, by the container, the set of data from the source cloud bucket to the destination cloud bucket based on the source metadata and generating, by the container, destination metadata for the set of data as stored at the destination cloud bucket.

In one embodiment, a non-transitory machine-readable medium having instructions stored therein, which when executed by a processor, cause the processor to perform one or more operations, the operations including generating a container on a cloud platform and receiving, at the container, source metadata identifying a set of data to be migrated from a source cloud bucket associated with a source data domain to a destination cloud bucket associated with a destination data domain. The operations further include copying, by the container, the set of data from the source cloud bucket to the destination cloud bucket based on the source metadata and generating, by the container, destination metadata for the set of data as stored at the destination cloud bucket.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic, and one or more storage nodes or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage nodes 108-109. Restore logic 122 is configured to retrieve and restore backup data from any one or more of storage nodes 108-109 back to a client (e.g., clients 101-102).

In one embodiment, service engine/logic 106 may include a cloud migration module 125. Cloud migration module 125 may migrate or consolidate cloud data from one cloud bucket of a data domain system to another cloud bucket of a different data domain system. For example, cloud migration module 125 may include or may generate a container, or other cloud compute instance, to receive metadata from the first data domain system identifying data in the first cloud bucket to be migrated to the second cloud bucket. The container may use the metadata to retrieve and copy the cloud data from the first cloud bucket to the second cloud bucket. The container may then generate metadata for the data as stored at teh second cloud bucket and provide the metadata to the second data domain (e.g., on premises nodes) to store the metadata. The metadata can then be used by the second data domain to manage and retrieve the data from the second cloud bucket.

Storage nodes 108-109 may be implemented locally (e.g., single node operating environment) or remotely (e.g., multi-node operating environment) via interconnect 120, which may be a bus and/or a network (e.g., a storage network or a network similar to network 103). Storage nodes 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage nodes 108-109 may be located locally or remotely accessible over a network.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
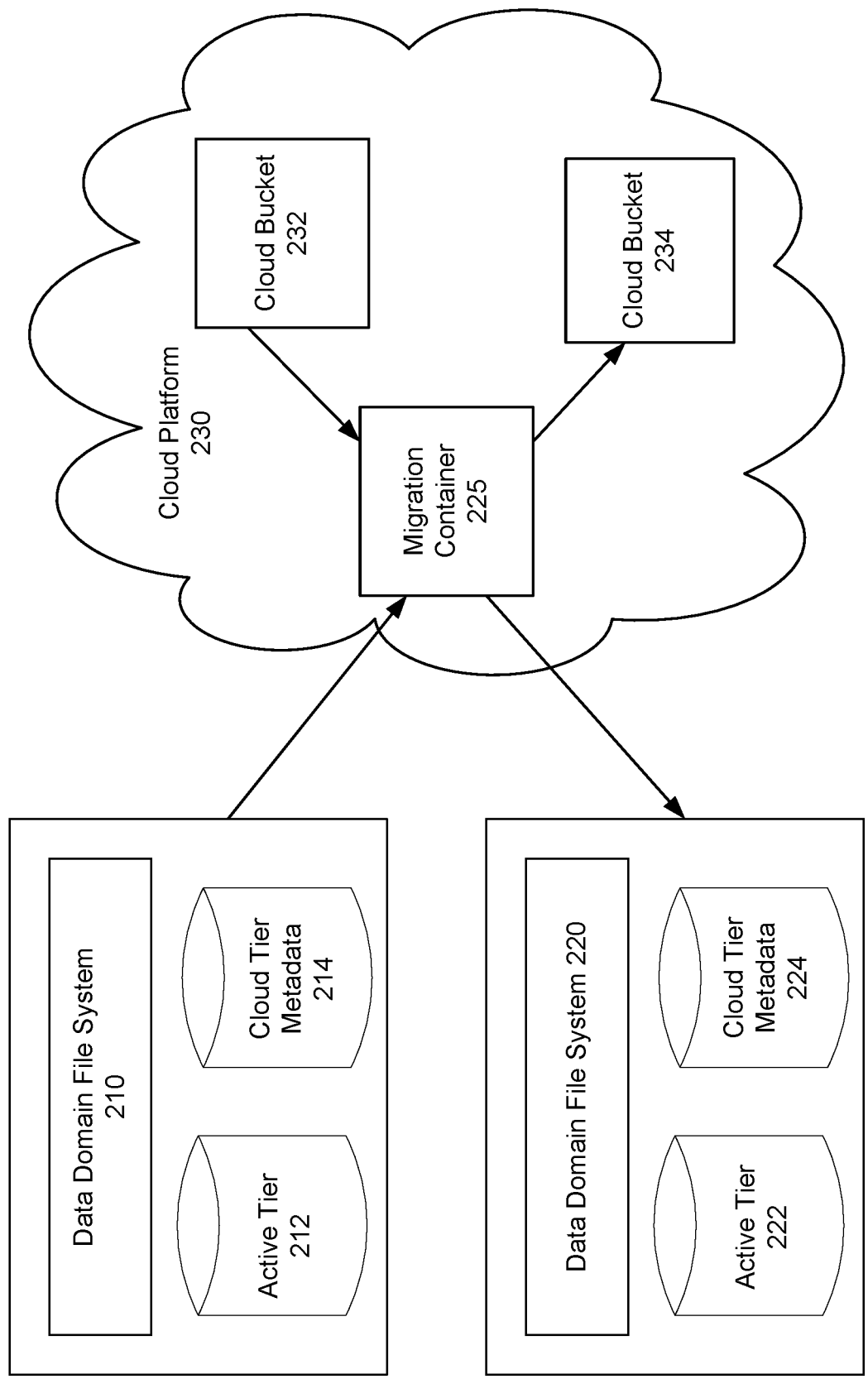
FIG. 2 is a block diagram illustrating an example file system to migrate cloud data from one cloud bucket to another, according to one embodiment of the disclosure.

FIG. 2 is a block diagram illustrating an example file system 200 to migrate cloud data from one cloud bucket to another. File system 200 includes a source data domain file system 210 associated with a source cloud bucket 232. The data domain file system 210 may be a distributed file system associated with a namespace. The data domain file system 210 may include an active storage tier 212 and cloud tier metadata 214. The active storage tier 212 may be on-premises storage providing for fast access of data stored at the active tier 212. The cloud tier metadata 214 may include metadata associated with data stored at the source cloud bucket 232. The data domain file system 210 may use the cloud tier metadata 214 stored locally at the data domain file system 210 to manage the data stored at the cloud bucket 232. For example, cloud tier metadata 214 may include object identifiers, compression region offsets, compression region sizes, etc. of data stored in the source cloud bucket 232.

File system 200 further includes a destination data domain file system 220 associated with a destination cloud bucket 234. Similar to data domain file system 210, the destination data domain file system 220 may be a distributed file system associated with another namespace. The destination data domain file system 210 may also include an active storage tier 222 and cloud tier metadata 224. The active storage tier 222 may be on-premises storage providing for fast access of data stored at the active tier 222. The cloud tier metadata 224 may include metadata associated with data stored at the destination cloud bucket 234. The destination data domain file system 210 may use the cloud tier metadata 224 stored locally at the data domain file system 220 to manage the data stored at the cloud bucket 234. For example, cloud tier metadata 224 may include object identifiers, compression region offsets, compression region sizes, etc. of data stored in the destination cloud bucket 2324

Cloud platform may be a collection of third-party managed computing resources located off-premises from the data domain file systems 210 and 220. Cloud platform 230 may be coupled to the source data domain file system 210 and the destination data domain file system via a network. Accordingly, conventional methods of data migration between the cloud buckets that would recall the data from the source cloud bucket 232 to the data domain file system 210 and then transfer the data to the destination domain file system followed by uploading the data to the destination cloud bucket 234 may cause substantial network traffic and latencies. Embodiments of the present disclosure include generating a migration container 225 at the cloud platform 230 to perform migration of data from source cloud bucket 232 to destination cloud bucket 234 without recalling the data to the local on-premises data domain file systems.

The cloud platform 230 may include processing logic (e.g., cloud migration module 125 described with respect to FIG. 1) to generate the migration container 225 in response to a request to migrate data from the source cloud bucket 232 to destination cloud bucket 234. The data domain file system 210 may then provide, to the migration container 225, metadata associated with the data to be migrated. The metadata may include one or more tuples identifying the data to be migrated and the storage location in the source cloud bucket 232 of the data to be migrated. The migration container 225 may then retrieve the data from the source cloud bucket 232 using the metadata (i.e., tuples) received from the data domain file system 210. The migration container 225 may then copy the data retrieved from the source cloud bucket 232 to the destination cloud bucket 234 and generate access and management metadata associated with the storage locations, size, etc. of the data as stored at the destination cloud bucket 234. The migration container 225 may then provide the access and management metadata to the data domain file system 220 to be stored in the cloud tier metadata 224. Therefore, the data domain file system 220 may use the cloud tier metadata 224 to access and manage the data migrated from the source cloud bucket 232. As such, only the metadata for the migrated data is transferred between local on-premises data domains and the cloud platform 230, reducing network traffic and latencies.

Figure 3:
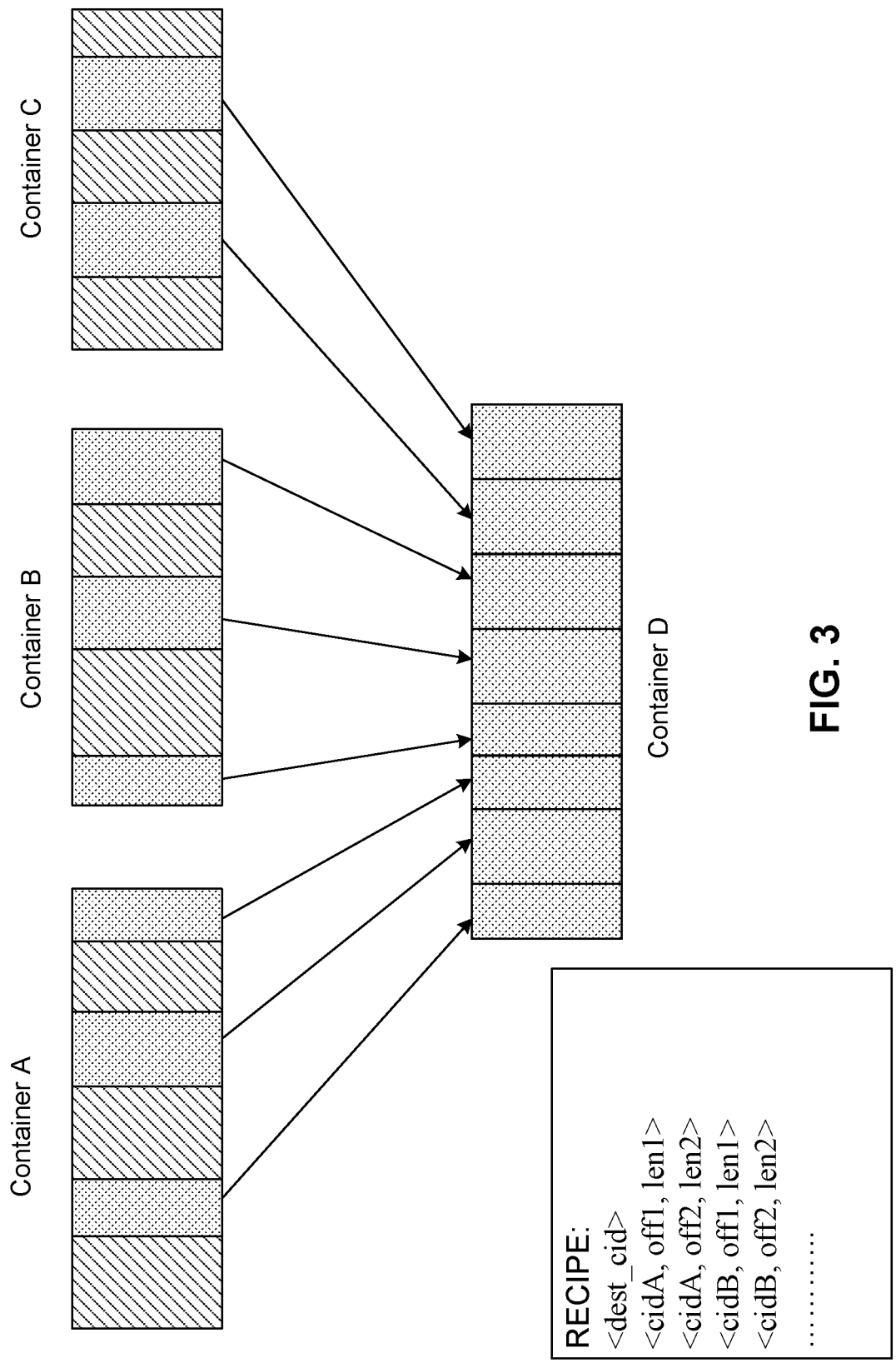
FIG. 3 depicts an example of a copy forward of data from a source cloud bucket to a destination cloud bucket according to one embodiment of the disclosure.

FIG. 3 depicts an example of a copy forward 300 of data from a source cloud bucket to a destination cloud bucket. In one example, a data domain file system is an inline data de-duplication file system. As data gets written to the file system, the DDFS breaks the data into variable sized segments. A group of the segments are packed in a compression region. Compression regions are then grouped together and written as a container to storage. The DDFS also calculates a fingerprint signature for each data segment (e.g., using SHA1 algorithm) and includes an on-disk fingerprint index table. The fingerprint index table maps the fingerprint of each of the data segments to a container-id of the container that includes the data segment. A data object container can include a metadata section followed by several data sections. The data sections store the compression regions while the container metadata section stores the meta information of the container (i.e., the total number of compression regions, the total number of segments, the fingerprint of each segment, the encryption, and compression information of the compression regions, etc.). However, when data is written to the cloud (e.g., a cloud bucket) the metadata sections are stored at a container locally at an on-premises data domain system while the actual data sections are stored in the cloud bucket.

For example, FIG. 3 depicts three containers, container A, container B, and container C. Each of the containers include several data regions, some of which may be live data regions while others are dead data regions (e.g., data that has been garbage collected). As described above, to migrate data from one cloud bucket to another, a source data domain may provide a container executing on the cloud platform with a set of tuples (herein referred to as a "recipe") of the data that is to be migrated. The recipe may include tuples, or metadata, identifying all, or a portion, of the live data regions of containers (e.g., containers A, B, and C) stored in a cloud bucket that are to be migrated. Using the tuples from the recipe, the compute instance may copy the data regions identified by the tuples to a newly generated container (i.e., container D) at the destination cloud bucket.

Figure 4:
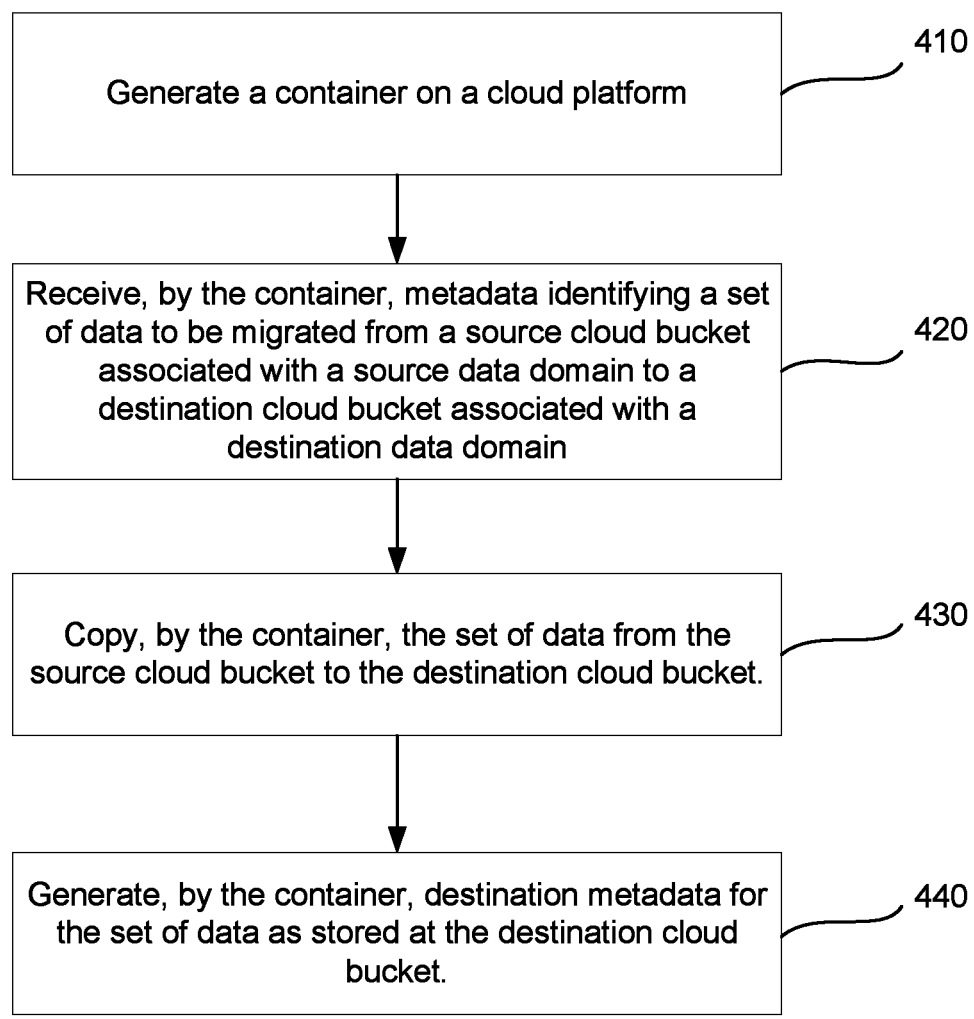
FIG. 4 is a flow diagram illustrating an example of migrating data between cloud buckets, according to one embodiment of the disclosure.

FIG. 4 is a flow diagram illustrating a process 400 of migrating data between cloud buckets according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by cloud migration module 125 of FIG. 1.

Referring to FIG. 4, the process begins at block 410, where processing logic generates a container on a cloud platform.

At block 420, the processing logic receives metadata identifying a set of data to be migrated from a source cloud bucket associated with a source data domain to a destination cloud bucket associated with a destination data domain. In one example, the set of data comprises a plurality of data regions of one or more data object containers at the source cloud bucket. In another example, the metadata identifying the set of data to be migrated comprises a plurality of tuples identifying each of the plurality data regions of the one or more data object containers at the source cloud bucket.

At block 430, the processing logic copies the set of data from the source cloud bucket to the destination cloud bucket. In one example, the source cloud bucket and the destination cloud bucket are located on a single cloud platform. In another example, the source cloud bucket is located on a first cloud storage platform and the destination cloud bucket is located on a second cloud storage platform. In one example, to copy the set of data from the source cloud bucket to the destination cloud bucket the processing logic retrieves the plurality of data regions from the one or more data object containers of the source cloud bucket, generates a destination container for the plurality of data regions, and copies the plurality of data regions to the destination container.

At block 440, the processing logic generates destination metadata for the set of data as stored at the destination cloud bucket. The processing logic may further store the destination metadata for the set of data as stored at the destination cloud bucket at a local tier of on-premises storage of the destination data domain.

Figure 5:
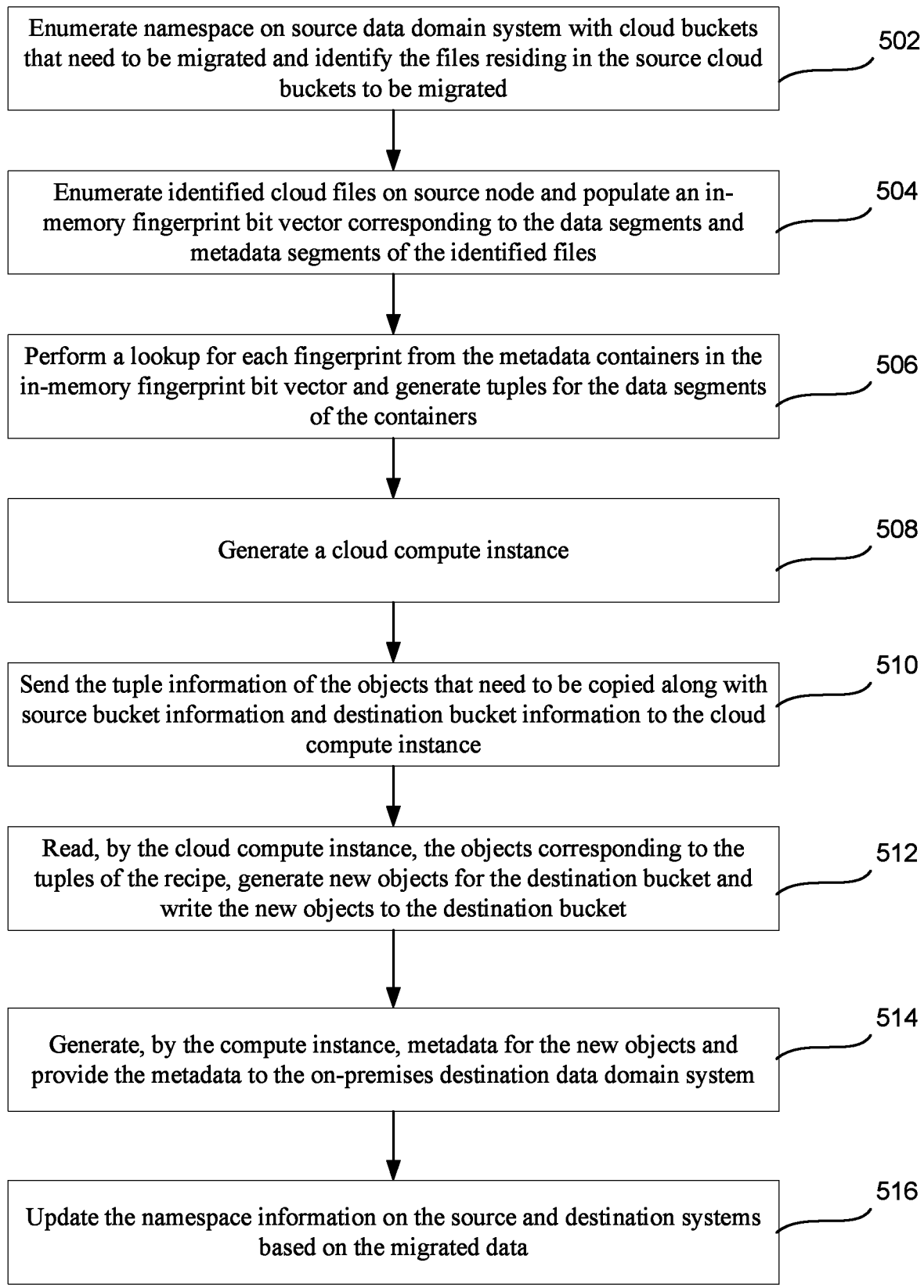
FIG. 5 is a flow diagram illustrating another example of migrating data between cloud buckets according to one embodiment.

FIG. 5 is a flow diagram illustrating a process 500 of migrating data from a source cloud bucket to a destination cloud bucket according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by cloud migration module 125 of FIG. 1.

Referring to FIG. 5, the process begins at block 502, where processing logic enumerates the namespace of a source data domain system with cloud buckets that need to be migrated and identifies the files residing in the source cloud buckets to be migrated.

At block 504, the processing logic enumerates the identified cloud files on the source node and populates an in-memory fingerprint vector corresponding to the data segments and metadata segments of the identified files. The processing logic may populate the in-memory fingerprint vector by generating or identifying fingerprints for data segments (e.g., compressions region) in the data domain system, applying a hash function to the fingerprints, and setting a corresponding bit of the fingerprint vector in memory. For example, metadata containers located at the source data domain system may store the metadata for each of the data segment containers stored at the source cloud bucket. The metadata of each of the data segment containers includes fingerprints and information (e.g., object identifiers, compression region offsets, compression region sizes, etc.) for each compression region of data segment containers. The processing logic may scan the metadata containers at the source data domain system and perform a lookup of each fingerprint from the metadata container in the in-memory fingerprint vector. If the fingerprint bit corresponding to the fingerprint being looked up, the corresponding data segment may need to be migrated to the destination cloud bucket. The data segments may map to an object identifier which may be associated with the metadata (e.g., offset and length) needed to identify and retrieve the data to be migrated from the source cloud bucket to the destination cloud bucket.

At block 506, the processing logic performs a lookup for each fingerprint from the metadata containers in the in-memory fingerprint bit vector and generates tuples for the data segments of the containers. At block 508, the processing logic generates a cloud compute instance. For example, the cloud compute instance may be a container (e.g., docker container), a data domain virtual edition (DDVE) container, or the like. At block 510, the processing logic sends the tuple information of the objects (i.e., data segments stored as objects) that need to be copied along with source bucket information and destination bucket information to the cloud compute instance. At block 512, the processing logic reads (e.g., by the cloud compute instance) the objects corresponding to the tuples for the data segments (i.e., the recipe) and generates new objects for the destination cloud bucket to store the data segments and writes the new objects to the destination bucket.

At block 514, the processing logic generates metadata for the new objects and provides the metadata to the on-premises destination data domain system. The destination data domain system may then generate new metadata containers to store references to the new objects stored at the destination cloud bucket. At block 516, the processing logic updates the namespace information on the source and destination data domain systems based on the migrated data. Accordingly, the cloud files identified at the source cloud bucket at block 504 may appear on the destination data domain system with the location of the files pointing to the destination cloud bucket.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
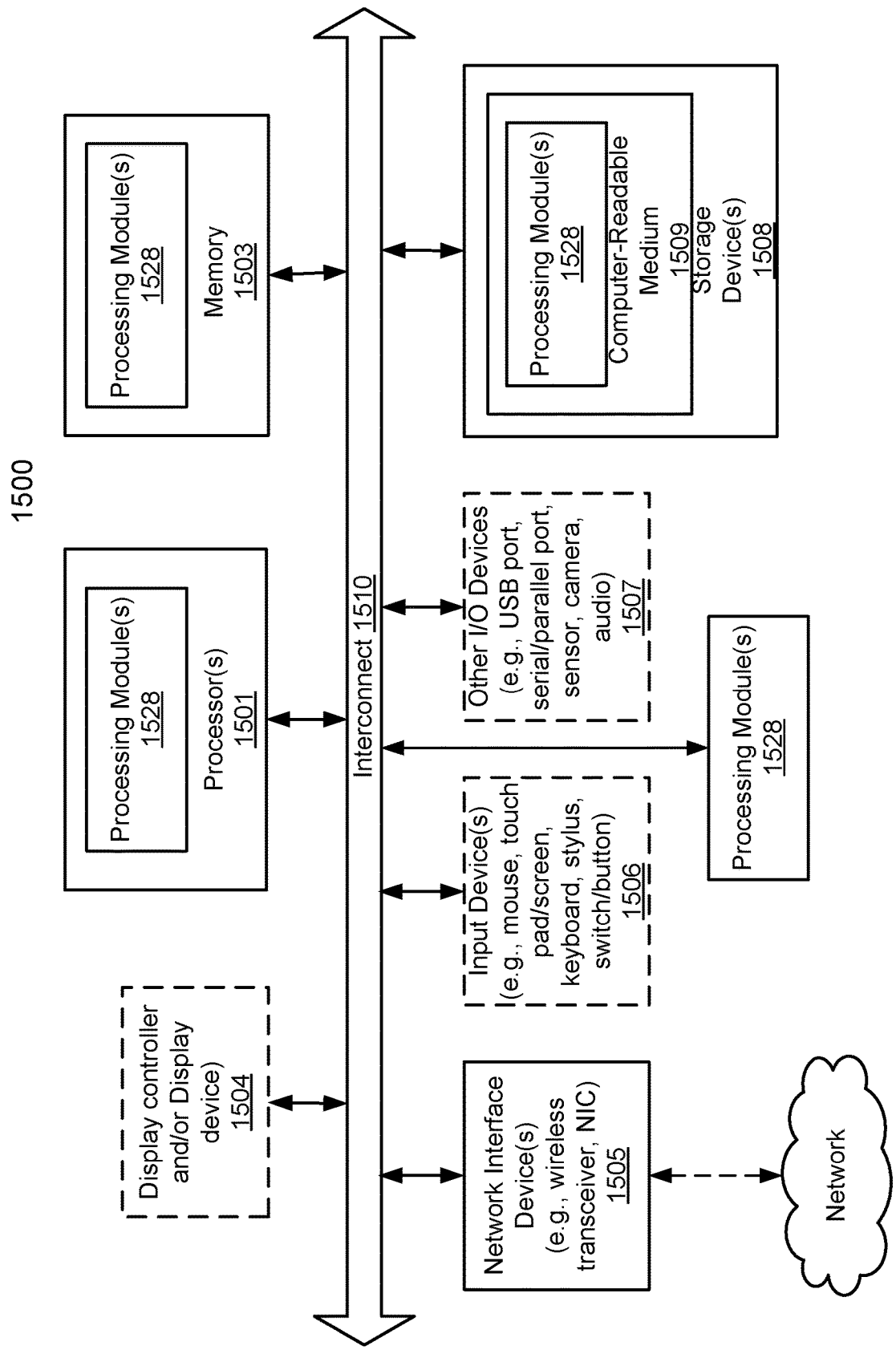
FIG. 6 is block diagram illustrating an example of a computing system that may be used in conjunction with one or more embodiments of the disclosure.

FIG. 6 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, the cloud migration module 125 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the same software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of migrating or consolidating cloud data comprising:
   generating a container on a cloud platform;
   receiving, at the container, source metadata identifying a set of data to be migrated from a source cloud bucket associated with a source data domain to a destination cloud bucket associated with a destination data domain;
   copying, by the container, the set of data from the source cloud bucket to the destination cloud bucket based on the source metadata; and
   generating, by the container, destination metadata for the set of data as stored at the destination cloud bucket.

2. The method of claim 1, further comprising:
   storing the destination metadata for the set of data as stored at the destination cloud bucket at a local tier of on-premises storage of the destination data domain.

3. The method of claim 1, wherein the source cloud bucket and the destination cloud bucket are located on a single cloud platform.

4. The method of claim 1, wherein the source cloud bucket is located on a first cloud storage platform and the destination cloud bucket is located on a second cloud storage platform.

5. The method of claim 1, wherein the set of data comprises a plurality of data regions of one or more data object containers at the source cloud bucket.

6. The method of claim 5, wherein the source metadata identifying the set of data to be migrated comprises a plurality of tuples identifying each of the plurality data regions of the one or more data object containers at the source cloud bucket.

7. The method of claim 6, wherein copying the set of data from the source cloud bucket to the destination cloud bucket comprises:
   retrieving, by the container, the plurality of data regions from the one or more data object containers of the source cloud bucket;
   generating, by the container a destination container for the plurality of data regions; and
   copying, by the container, the plurality of data regions to the destination container.

8. A system comprising:
   a memory; and
   a processing device operatively coupled to the memory, the processing device to perform operations comprising:
   generating a container on a cloud platform;
   receiving, at the container, source metadata identifying a set of data to be migrated from a source cloud bucket associated with a source data domain to a destination cloud bucket associated with a destination data domain;
   copying, by the container, the set of data from the source cloud bucket to the destination cloud bucket based on the source metadata; and
   generating, by the container, destination metadata for the set of data as stored at the destination cloud bucket.

9. The system of claim 8, further comprising:
   storing the destination metadata for the set of data as stored at the destination cloud bucket at a local tier of on-premises storage of the destination data domain.

10. The system of claim 8, wherein the source cloud bucket and the destination cloud bucket are located on a single cloud platform.

11. The system of claim 8, wherein the source cloud bucket is located on a first cloud storage platform and the destination cloud bucket is located on a second cloud storage platform.

12. The system of claim 8, wherein the set of data comprises a plurality of data regions of one or more data object containers at the source cloud bucket.

13. The system of claim 12, wherein the source metadata identifying the set of data to be migrated comprises a plurality of tuples identifying each of the plurality data regions of the one or more data object containers at the source cloud bucket.

14. The system of claim 13, wherein copying the set of data from the source cloud bucket to the destination cloud bucket comprises:
   retrieving, by the container, the plurality of data regions from the one or more data object containers of the source cloud bucket;
   generating, by the container a destination container for the plurality of data regions; and
   copying, by the container, the plurality of data regions to the destination container.

15. A non-transitory machine-readable medium having instructions stored therein, which when executed by a processor, cause the processor to perform one or more operations, the operations comprising:
   generating a container on a cloud platform;
   receiving, at the container, source metadata identifying a set of data to be migrated from a source cloud bucket associated with a source data domain to a destination cloud bucket associated with a destination data domain;
   copying, by the container, the set of data from the source cloud bucket to the destination cloud bucket based on the source metadata; and
   generating, by the container, destination metadata for the set of data as stored at the destination cloud bucket.

16. The non-transitory machine-readable medium of claim 15, further comprising:
   storing the destination metadata for the set of data as stored at the destination cloud bucket at a local tier of on-premises storage of the destination data domain.

17. The non-transitory machine-readable medium of claim 15, wherein the source cloud bucket and the destination cloud bucket are located on a single cloud platform.

18. The non-transitory machine-readable medium of claim 15, wherein the set of data comprises a plurality of data regions of one or more data object containers at the source cloud bucket.

19. The non-transitory machine-readable medium of claim 18, wherein the source metadata identifying the set of data to be migrated comprises a plurality of tuples identifying each of the plurality data regions of the one or more data object containers at the source cloud bucket.

20. The non-transitory machine-readable medium of claim 19, wherein copying the set of data from the source cloud bucket to the destination cloud bucket comprises:
   retrieving, by the container, the plurality of data regions from the one or more data object containers of the source cloud bucket;
   generating, by the container a destination container for the plurality of data regions; and copying, by the container, the plurality of data regions to the destination container.

\* \* \* \* \*